UNITED STATES PATENT OFFICE.

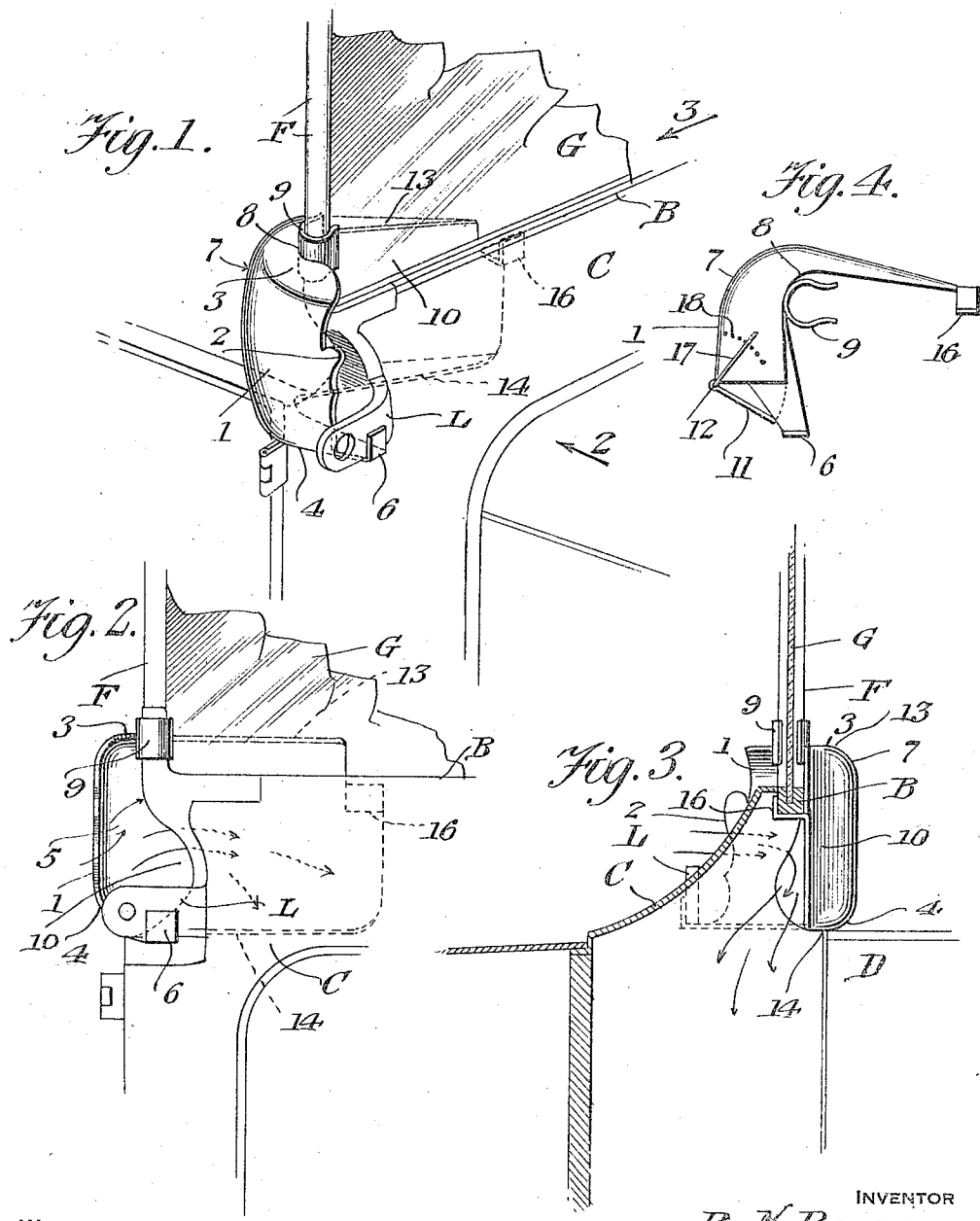

RALPH N. BEARE, OF AVERY, OHIO.

AUTOMOBILE-VENTILATOR.

1,247,490.   Specification of Letters Patent.   Patented Nov. 20, 1917.

Application filed December 29, 1916.   Serial No. 139,583.

*To all whom it may concern:*

Be it known that I, RALPH N. BEARE, a citizen of the United States, residing at Avery, in the county of Erie and State of Ohio, have invented new and useful Improvements in Automobile-Ventilators, of which the following is a specification.

This invention relates to ventilation, and more especially to those devices which use natural draft for injecting a blast of air at a point where it will be serviceable. Specifically the invention is a ventilator for use on automobiles, and its purpose is to catch some of the air blowing past the end of the cowl dash and windshield, and direct it into the front portion of the car body which is usually over-heated by the proximity of the engine so that the driver's feet are warm if the fore doors of his machine are closed.

The invention is described below and is shown on the accompanying drawings as applied to one end of the dash and windshield of an ordinary automobile. Efforts have hitherto been made to collect a portion of the breeze created by the rapid movement of an automobile along the road and carry it over the top of the dash and down onto the feet of the driver, and the dash and other portions of the car structure have been provided with ventilator openings with or without dampers; but I am not aware that a practical device has hitherto been produced for gathering the air flowing past the ends of the windshield and dash and utilizing it for this purpose. Such is my invention, and in the drawings hereunto attached—

Figure 1 is a perspective view of this ventilator attachment applied to the right end of the cowl dash of an automobile, and the right end of the frame of its windshield.

Fig. 2 is a front elevation of the same parts, viewed in about the direction of the arrow 2 in Fig. 1, and Fig. 3 is a sectional view of certain parts of the automobile, looking at the attachment in about the direction of the arrows 3 in Fig. 1.

Fig. 4 is a plan view of the attachment alone, showing a slight modification which will be explained below.

We are concerned only with the cowl dash C which usually terminates at its upper or rear edge in a bead B, the lamp bracket L carried by this or any ordinary dash, and the storm front or windshield which in the present case is composed of glass G mounted within a frame F. These parts are all of the usual or any ordinary construction, and no novelty is claimed therefor.

Coming now to the details of my ventilator or attachment, I would say that it is by preference made of pressed steel or the like, suitably treated by painting, japanning, or nickeling, although of course it could be of other metal and other ornamentation. It will be made in right-hand and left-hand members which are complementary to each other, and one or both can be used although I need describe but one. It may be also made in sizes, and possibly it may be prepared in specific shapes for certain machines. In general it is substantially an L-shaped structure when viewed from above, one arm which is the front arm of the L being somewhat dished or scoop-shaped when seen from the front, and the other arm which is the rear arm being nearly flat.

Referring now specifically to the accompanying drawings, the numeral 1 designates broadly the front arm of this attachment, whose front edge 2 may be irregular as best seen in Fig. 1 so as to fit up close to the lamp, and the arm consists of a substantially upright wall, turned in at its upper and lower edges into top wall 3 and a bottom wall 4 so as to produce a scoop-shaped mouth best seen at 5 in Fig. 2—the top and bottom and outer sides of this mouth being closed by the walls referred to and the inner side standing wide open adjacent the end frame F of the windshield and the extremity of the cowl C. The bottom wall is continued forward and turned upward into a hook or equivalent member 6 for engaging with the lamp bracket L, to which it may be screwed or riveted if desired. At the angle of the L-shaped structure which constitutes this attachment, the outer wall is rounded gently as at 7 to avoid all corners on angles, the inner edge of the top wall is cut out rather sharply at 8 to produce a recess in which is fastened a clasp 9, preferably having two yielding arms which clamp the frame F of the windshield, and the bottom wall 4 is carried around over the edge of the fore door D as best seen in Fig. 3. The inner arm of the attachment comprises a substantially flat upright wall as indicated at 10 and continuations of the top and bottom walls as indicated at 13 and 14 in Fig. 1, these continuations growing narrower toward the inner extremity of the inner arm, and possibly fading out entirely about as shown. The metal composing the upper inner corner of the inner arm may be cut away from the wall 10 and bent into a hook or other equivalent device 16 which may be engaged beneath the bead B at the inner edge of the cowl, as best seen in Fig. 3, and here again this hook may be riveted or screwed thereto if desired. I have omitted the rivets or screws, because ordinarily they are not necessary as the device is supported at the hinge end of the door and the extremity of the cowl, by the clasp 9, and by the two hooks without the necessity for screws.

A ventilator attachment made substantially in accord with the above description and the illustration on the drawings herewith may be applied to well known types of automobiles now on the market by engaging its clasp 9 with the frame F of the windshield and its hooks 6 and 16 with the lamp bracket and the cowl edge or bead as described, and it is obvious that the open mouth 5 will catch some of the air which hitherto passed the end of the windshield and cowl dash, and convey it to and around the bend of the attachment and thence along the forward face of the upright wall 10, delivering it inward behind the cowl and downward on to the driver's feet which are ordinarily too warm by reason of the proximity of the engine.

In Fig. 4 I have shown a slight modification or rather an amplification diagrammatically, and the same consists only in hinging a door 11 at 12 to the front end of the device and providing a handle 17 by which the position of the door may be adjusted in any suitable way as, for instance, by forming a serrated rack 18 on the top of the attachment and moving the handle over the serrations therein until the door stands at the desired angle. This or any other equivalent damper or regulator might be applied to the ventilator attachment either at its front end or at any other suitable point, but by preference I would have the handle thereof in reach of a person within the car so that it can be adjusted without the necessity for leaving the same. I lay no stress on the exact details of the addition, and claim no novelty for it excepting in combination with the ventilator which forms the principal feature of this invention. Its obvious use is to shut off the flow of fresh air into the car at times when it is not desired, as when it is extremely cold or when the weather is inclement and the ventilator attachment catches rain or snow.

What is claimed as new is:

1. In an automobile having a cowl dash and windshield and provided with a lamp bracket at each end of said dash, a ventilator substantially L-shaped in plan view and whose arms are U-shaped in cross-section, its angle adapted to pass around the end of the windshield and dash, a clasp in said angle adapted to engage the wind shield-frame, and hooks at the extremities of its arms adapted to respectively engage the bead on the dash and the lamp bracket, the whole for use substantially as described.

2. The herein described ventilator for automobiles, the same comprising a structure substantially L-shaped in plan view with its front arm composed of an upright outer wall and top and bottom walls projecting inwardly therefrom, and its rear arm including a substantially upright wall adapted to stand in rear of the dash and top and bottom walls projecting forwardly from said upright walls, the angle of said structure adapted to pass around the end of the dash and wind shield, and means for fastening both arms to the automobile so that the open end of the front arm catches the draft of air set up by the progress of the automobile, while the rear arm delivers the air laterally behind the dash.

In testimony whereof I affix my signature.

RALPH N. BEARE.

Copies of this patent may be obtained for five cents each, by addressing the "Commissioner of Patents, Washington, D. C."